(12) United States Patent
Kuehne et al.

(10) Patent No.: US 11,514,126 B2
(45) Date of Patent: Nov. 29, 2022

(54) SYSTEMS AND METHODS FOR SAVING AND SURFACING CONTENT

(71) Applicant: Google LLC, Mountain View, CA (US)

(72) Inventors: Kerstin Kuehne, London (GB); Ivana Tomic, London (GB); Melinda Hillary Klayman, London (GB); Jamie Keene, London (GB); Iuliana Georgiana Ginghina, London (GB); Edmund William Wright, London (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/877,999

(22) Filed: May 19, 2020

(65) Prior Publication Data
US 2021/0365504 A1    Nov. 25, 2021

(51) Int. Cl.
G06F 16/954      (2019.01)
G06F 16/9532     (2019.01)
G06F 16/957      (2019.01)
G06F 16/9538     (2019.01)

(52) U.S. Cl.
CPC ........ *G06F 16/954* (2019.01); *G06F 16/9532* (2019.01); *G06F 16/9538* (2019.01); *G06F 16/9574* (2019.01)

(58) Field of Classification Search
CPC .......................... G06F 16/954; G06F 16/9538
See application file for complete search history.

(56) References Cited

U.S. PATENT DOCUMENTS

| 6,100,890 A * | 8/2000 | Bates ................. G06F 16/9562 |
| | | 715/826 |
| 8,910,060 B2 | 12/2014 | Chandra |
| 2003/0005041 A1 | 1/2003 | Ullmann et al. |
| 2007/0209007 A1* | 9/2007 | Phillips ................. G06F 3/0485 |
| | | 715/738 |
| 2012/0216102 A1 | 8/2012 | Malla |
| 2013/0073948 A1* | 3/2013 | Bryar ................... G06F 40/131 |
| | | 715/234 |

(Continued)

FOREIGN PATENT DOCUMENTS

| JP | 2007/317105 | 12/2007 |
| JP | 2008/070942 | 3/2008 |
| JP | 2015/094978 | 5/2018 |

OTHER PUBLICATIONS

"1 Web & PDF Highlighter—LINER", https://chrome.google.com/webstore/detail/1-web-pdf-highligher-lin, retrieved on May 22, 2020, 2 pages.

(Continued)

*Primary Examiner* — Hosain T Alam
*Assistant Examiner* — Anthony G Gemignani
(74) *Attorney, Agent, or Firm* — Dority & Manning, P.A.

(57) ABSTRACT

A computer-implemented method is disclosed for saving content. The method can include receiving, by one or more computing devices from a user at a first time, a first user input directed to a portion of a web page; receiving, by the one or more computing devices at a second time after the first time, a second user input describing a search query, and providing for display, by the one or more computing devices, data describing the portion of the web page in response to receiving the second user input.

20 Claims, 11 Drawing Sheets

(56) References Cited

U.S. PATENT DOCUMENTS

| | | | | |
|---|---|---|---|---|
| 2013/0283150 A1* | 10/2013 | Chen | ................... | G06F 16/9574 |
| | | | | 715/234 |
| 2014/0075376 A1* | 3/2014 | Tsuda | ................. | G06F 3/04855 |
| | | | | 715/787 |
| 2015/0135133 A1* | 5/2015 | Munoz-Bustamante | ..................... | |
| | | | | G06F 3/0485 |
| | | | | 715/785 |
| 2017/0364221 A1* | 12/2017 | Bacus | ................... | G06F 3/0483 |
| 2019/0266204 A1 | 8/2019 | Chandra | | |

OTHER PUBLICATIONS

Parent-Levesque, "Highlighter", https://chrome.google.com/webstore/detail/highlighter, retrieved on May 22, 2020, 2 pages.
"Quick Scroll Chrome Extension", https://support.google.com/faqs/answer/6110110?hl=en, retrieved on May 22, 2020, 1 page.
"Weava Highlighter—PDF & Web", https://chrome.google.com/webstore/detail/weava-hightligther-pdf-web, retrieved on May 22, 2020, 2 pages.
"Youtube Bookmark", htps://chrome.google.com/webstore/detail/youtube-bookmarker, retrieved on May 22, 2020, 1 page.
Extended European Search Report for application No. EP21174838,9, dated Oct. 11, 2021, 78 pages.

* cited by examiner

SYSTEMS AND METHODS FOR SAVING AND SURFACING CONTENT

FIELD

The present disclosure relates generally to payment and identification systems. More particularly, the present disclosure relates to systems and methods for saving and surfacing content.

BACKGROUND

Computing systems can facilitate web browsing by retrieving web pages. Users can bookmark or otherwise save web pages for later viewing. However, current systems and methods fail to re-surface previously viewed and/or saved content in an intelligent and/or useful way.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for saving content. The method can include receiving, by one or more computing devices from a user at a first time, a first user input directed to a portion of a web page; receiving, by the one or more computing devices at a second time after the first time, a second user input describing a search query; and providing for display, by the one or more computing devices, data describing the portion of the web page in response to receiving the second user input.

Another example aspect of the present disclosure is directed to a system for saving content. The system can include at least one processor and at least one tangible, non-transitory computer-readable medium that stores instructions that, when executed by the at least one processor, cause the at least one processor to perform operations. The operations can include receiving, by one or more computing devices from a user at a first time, a first user input directed to a portion of a web page; receiving, by the one or more computing devices at a second time after the first time, a second user input describing a search query; and providing for display, by the one or more computing devices, data describing the portion of the web page in response to receiving the second user input.

Another example aspect of the present disclosure is directed to a computer-implemented method for saving content. The method can include receiving, by one or more computing devices from a user at a first time, a first user input directed to a portion of a first version of a web page; receiving, by the one or more computing devices at a second time after the first time, a second user input requesting display of the web page; detecting, by the one or more computing devices, a second version of the web page that has been created after the first time; providing for display, by the one or more computing devices, a user interface comprising at least one of the first version of the web page and the second version of the web page; receiving, by the one or more computing devices, a third user input requesting display of the other of the first version of the web page and the second version of the web page; and updating, by the one or more computing devices, the user interface to display the other of the first version of the web page or the second.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
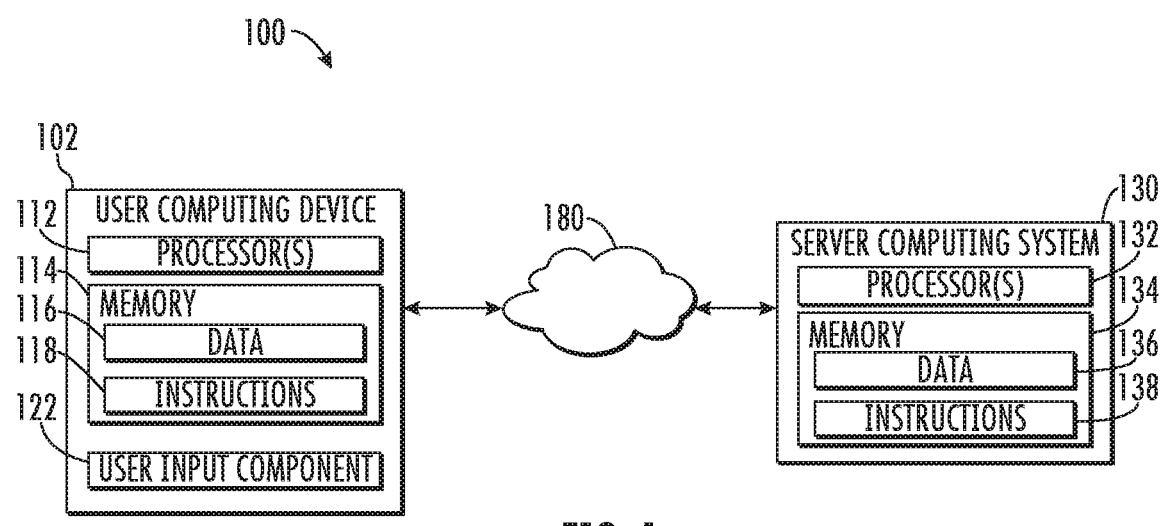
FIG. 1 depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to systems and methods for saving and surfacing content based on the saved content. The computer system can display one or more web pages, documents, or other types of content. A user can browse and/or navigate between various web pages using a computer application of the computer system, such as a web browser application. The user can identify content of particular interest to the user. At a first time, the user can highlight or otherwise provide a first user input that is directed to a portion of the web page and/or requesting that the portion be saved for later viewing. The computing system can be configured to resurface the highlighted content and/or content selected based on the highlighted content at a later. For example, the computing system can receive, at a second time after the first time, a second user input describing a search query. The computing system can display data describing the portion of the web page (e.g., the highlighted portion) in response to receiving the second user input. The computing system can display a list of search results and data describing the highlighted portion of the web page can be displayed in the list of search results and/or in a separate region or panel. For example, the highlighted web page can be included in the list of search results and the data describing the highlighted portion of the web page can be displayed in the list of search results. However, in other embodiments, the web page and/or data describing the highlighted portion of the web page can be displayed in a separate panel and/or region from the list of search results (e.g., based on relevance with the search results and/or search query). Thus, the computing system can intelligently surface previously highlighted content and/or content selected on previously highlighted content at a time after the content was highlighted.

In some embodiments, the first user input can be directed to a text segment of a web page (e.g., a web page that is displayed in a user interface). The first user input can include a touch input that requests highlighting and/or selection of the text segment, such as a tapping/dragging input on a touch sensitive display. The computing system can provide at least a portion of the text segment of the web page for display in response to receiving the second input that describes the search query.

In some embodiments, the computing system can display search results that can include the web page that was previously highlighted. As one example, the search results can include a list of items, which can include the web page. Text indicating that the user has previously highlighted something from the web page can be displayed adjacent the web page in the list. As a further example, some or all of the portion of the web page to which the first user input was directed (e.g., the content previously highlighted from the web page) can be displayed in the list of search results.

However, in other embodiments, the computing system can provide search results for display in a first region of a user interface in response to receiving the second user input describing the search query. The search results can include a list of items, and the data describing the portion of the web page (e.g., the previously highlighted portion) can be displayed in a second region of the user interface that is outside of the list of items of the search results and/or distinct from the first region. For example, the search results can be displayed in a first panel, and the data describing the portion of the web page can be displayed in a second panel. For instance, a list of previously highlighted web pages and/or content from the previously highlighted web pages can be displayed concurrently with the search results. The previously highlighted web pages can be selected based on being associated with and/or relevant to the search query and/or search results.

In some embodiments, providing for display the data describing the portion of the web page can include providing data describing the first time at which the first user input was received. As one example, text describing a day and/or time that the previous highlighting occurred (e.g., the first time) can be displayed, such as "You highlighted this page on [insert date and/or time]." As another example, a relative time interval can be displayed that describes how long ago the first user input was received (e.g., when the previous highlighting occurred). For instance, the computing system can display, "You highlighted content on this web page three days ago." As a further example, the computing system can display, "You highlighted [some or all of the highlighted text reproduced] on this web page two weeks ago." As another example, excerpts can be provided from one or more of the items in the list of search results. The computing system can display data describing the portion of the web page by including the portion in the respective excerpt for the web page. Thus, the computing system can provide data that describes receiving the first user input.

In some embodiments, the computing system can display some or all of the previously highlighted content in a separate region or panel that is adjacent the search results. The previously highlighted content can be displayed based on the highlighted content being similar to the search results and/or relevant to the search query. As a further example, the computing system can select one or more web pages or other documents as relevant to the search query based on the previously highlighted content.

In some embodiments, the computing system can select, based on the portion of the web page to which the first user input was directed, an additional web page that is distinct from the web page to which the first user input was directed. The computing system can display data that describes the additional web page in response to receiving the second user input describing the search query. As one example, the computing system can display, "The following web pages may be interesting to you based on your highlight of [highlighted content] on [web page to which the first user input was directed]."

In some embodiments, in response to receiving a user input that requests display of a web page that the user has previously visited, the computing system can automatically display a last viewed portion of the web page. When the user revisits a web page that the user has previously visited, the computing system can automatically navigate to the last viewed portion of the web page. The computing system can automatically display an indicator, such as "Pick Up Where You Left Off," or the like to explain or describing the automatic navigation within the web page to the last viewed portion of the web page.

In some embodiments, the computing system can establish one or more automatic bookmarks based on how the user has navigated the web page. For example, if the user has lingered on a particular portion of the web page, the computing system can save an automatic bookmark at the particular portion of the web page. For example, the computing system can automatically save a bookmark in response to the user scrolling slower than threshold scrolling speed and/or statically viewing a particular portion of the web page for longer than a threshold period of time.

Furthermore, in some embodiments, eye-tracking technology can be employed, for example, to more accurately automatically bookmark the web page. Movements, gaze locations, gaze durations, and the like of one or more of the user's eyes can be detected. For example, the computing system can include a forward-facing camera that can detect one or more images of the user's eyes. The computing system can determine a focal point of the user's eyes with respect to the web page. The focal point can be detected or tracked over a time period during which the user is viewing the web page. In response to the focal point (e.g., eye movement(s), gaze location(s), and/or gaze duration(s)) satisfying one or more threshold criteria, a portion of the web page corresponding with the gaze location(s) and can be automatically bookmarked for display when the user returns to the web page.

When the user returns to the web page at a later time, the computing system can select automatically navigate to one or more of the automatic bookmarks. Further, in some embodiments, when the user returns to the web page, the computing system can display one or more indicators visually describing relative locations of one or more of the automatic bookmarks.

In some embodiments, in response to receiving a user input that requests display of a web page that the user has previously highlighted or otherwise provided an input requesting saving or the like of a portion of the web page, the computing system can automatically display the portion of the web page. For example, the computing system can automatically navigate to the highlighted portion of the web page within the web page. If multiple portions of a single web page are highlighted, the computing system can automatically navigate to the last highlighted portion and/or provide multiple windows and/or panels displaying respective highlights within the web page.

In some embodiments, in response to receiving a user input that requests display of a web page that the user has previously visited, the computing system can display a previously highlighted portion of the web page and/or a portion to which the first user input was directed. For example, the computing system can automatically navigate to the portion of the web page that was previously highlighted.

In some embodiments, the computing system can display one or more indicators that can describe relative locations of respective highlighted portions of the currently displayed web page. For example, one or more on-screen indicator can correspond with respective highlighted portion(s) that are currently displayed in the user interface. One or more off-screen indicators can be displayed to indicate relative positions of off-screen highlighted portions of the web page with respect to the currently displayed portion of the web page. The off-screen indicators can be spaced in a vertical direction in proportion to respective vertical positioning of off-screen highlighted portions of the web page. In this example, the indicators can be positioned along an edge of the user interface. However, the indicators can be located at any suitable location within the user interface. Additionally, in some embodiments, the indicators can convey color, category, and/or style information with respect to the respective highlighted portions of the web page. For instance, the indicators can include respective colors corresponding with the respective colors of the highlighted portions to which the indicators correspond. Thus, the computing system can display one or more indicators to convey to the user one or more of a number, a relative location, and/or a color/style of highlighted sections within the currently displayed web page.

In some embodiments, in response to detecting a user input directed to an off-screen indicator, the computing system can navigate to a previously highlighted portion of the web page that corresponds with the indicator to which the user input is directed. Thus, the indicators can facilitate navigation within the web page between previously highlighted portions of the web page.

Aspects of the present disclosure are directed to facilitating switching between a highlighted version of a web page and a more recent version of the web page. The computing system can be configured to detect when a previously highlighted webpage has been updated and display a notification indicating that the requested web page has been updated since the user has highlighted the web page. For example, the notification can include a first button configured to open a copy or version of the web page that includes the user's highlights. The notification can include a second button configured to open an updated or "live" version of the web page. In response to selection of one of the buttons, the computing system can display the requested version of the web page. For example, in response to receiving a user input directed to the button that is configured to open the version of the web page including the user's highlights.

The computing system can identify when a previously highlighted webpage has been updated and notify the user (e.g., when the user attempts to revisit the highlighted web page). The computing system can provide the user with the ability to switch between the outdated, highlighted version and the newer, updated version of the web page. More specifically, the computing system can be configured to receive, from a user at a first time, a first user input directed to a portion of a first version of a web page. For example, a user can highlight text on the web page at the first time. The computing system can receive, at a second time after the first time, a second user input that requests display of the web page. For example, the user can revisit or return to the web page that the user previously highlighted. The computing system can detect that a second version of the web page has been created after the first time and can display a user interface including at least one of the first version of the web page and the second version of the web page. The computing system can receive a third user input requesting display of the other of the first version of the web page and the second version of the web page (e.g., requesting switching between the respective versions of the web page). The computing system can update the user interface to display the other of the first version of the web page or the second. For example, the computing system can switch between displaying the currently displayed version of the web page and the version of the web page that is not displayed.

In some embodiments, the computing system can associate data describing the web page and/or the portion of the web page to which the first user input was directed with a user profile associated with the user. The computing system can select previously highlighted web pages and/or select search results for display based on the user profile. For example, aspects of the present disclosure can be provided as and/or in conjunction with a personal assistant.

The systems and methods of the present disclosure can provide a number of technical effects and benefits, including reducing computational resources required to navigate to a desired portion of a document (e.g., web page). For example, in response to receiving a user input describing a search query, the computing system can automatically navigate to the last viewed portion of the web page and/or a previously highlighted portion of the web page. The computational resources required to open the web page to a beginning of the web page and then navigate to the last viewed portion and/or previously highlighted portion of the web page can be reduced.

Aspects of the present disclosure can be included or otherwise employed within the context of an operating system, a system-level operating layer, an application, a web browser plug-in, or in other contexts. Thus, in some implementations, the aspects of the present disclosure can be included in or otherwise stored and implemented by a user computing device such as a laptop, tablet, or smartphone. As yet another example, the aspects of the present disclosure can be included in or otherwise stored and implemented by a server computing device that communicates with the user computing device according to a client-server relationship. For example, some aspects can be implemented by the server computing device as a portion of a web service (e.g., a web email service).

With reference now to the Figures, example embodiments of the present disclosure will be discussed in further detail.

Example Devices and Systems

FIG. 1 depicts a block diagram of an example computing system 100 for receiving data describing an electronic item according to example embodiments of the present disclosure. The system 100 can include a user computing device 102 and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations. Electronic items and/or data describing electronic items can be stored in one more local memory locations of the user computing device 102. For example, the local memory location can correspond with the memory 114.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication. The user computing device 102 can also include one or more sensors 124, such as microphones, cameras, temperature sensors, accelerometers, and the like.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example Embodiments

Figure 2:
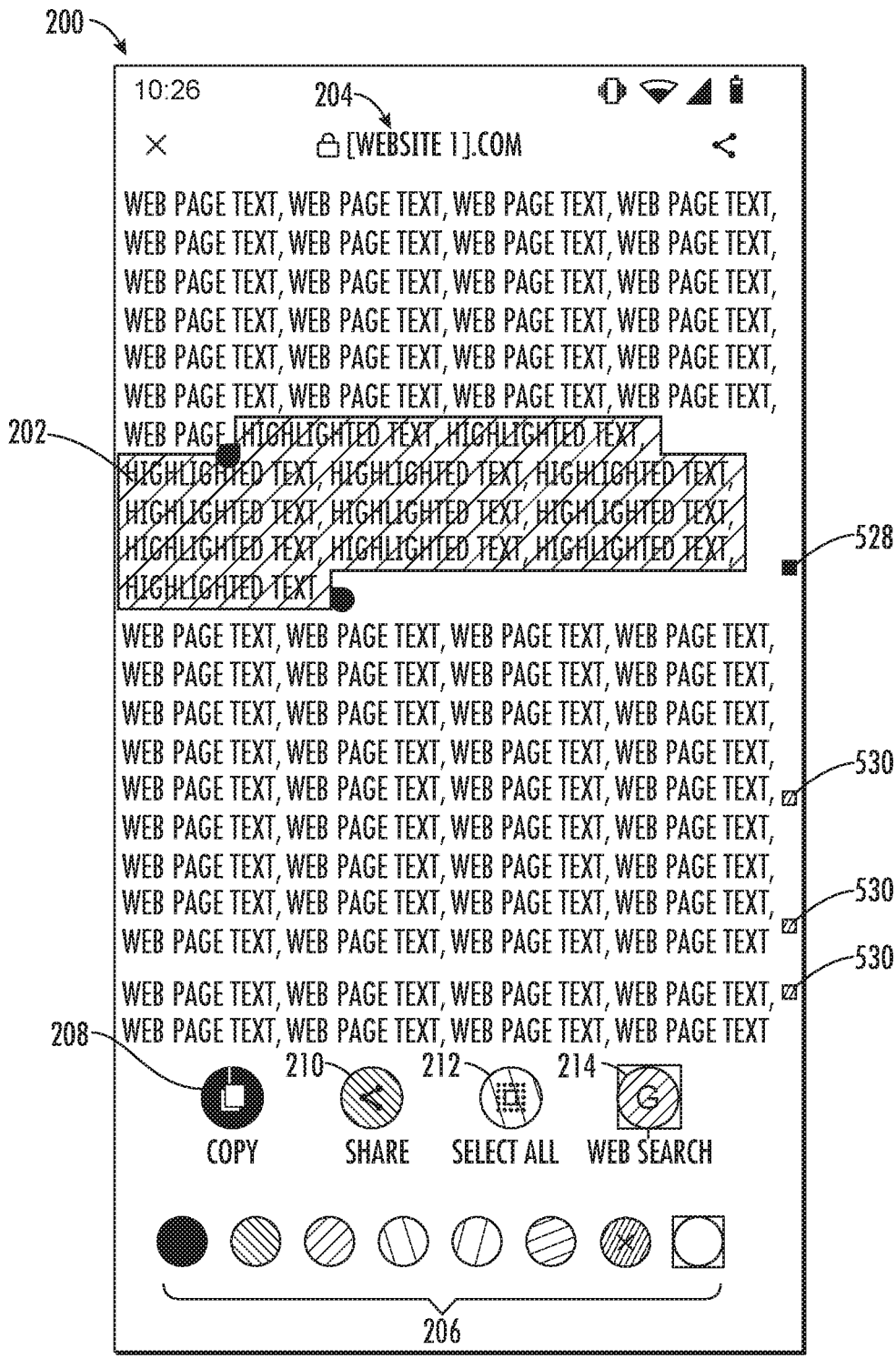
FIG. 2 depicts a user interface of a user computing device in which a user input is received according to aspects of the present disclosure.

FIG. 2 depicts a user interface 200 of a user computing device in which a user input is received according to aspects of the present disclosure. The user computing device can receive, from a user at a first time, a first user input directed to a portion 202 of a web page 204. For example, the user can provide a touch input to a touch sensitive display screen (e.g., a tap and drag movement) to highlight the portion 202 of the web page 204. The user interface 200 can provide the user with one or more color/style selections 206 for highlighting the portion 202 of the web page 204. For example, the user can switch between different color/style selections 206 to distinguish between different subject matter, intended uses, at the like for the various highlighted portions 202. The user interface 200 can include a copy button 208, share button 210, select all button 212, and/or web search button 214. In response to selection of the copy button 208, the computing system can save the portion 202 of the web page 204 (e.g., for pasting into a document). In response to selection of the share button 210 the computing system can facilitate sending, posting, and/or transmitting of the portion 202 of the web page 204, for example to in a message, e-mail, to a social media website, and the like. In response to selection of the select all button 212, the computing system can select all of the text of the web page 204. In response to selection of the web search button 214, the computing system can be configured to facilitate a web search using some or all of the portion 202 of the web page 204 as a search query.

Figure 3A:
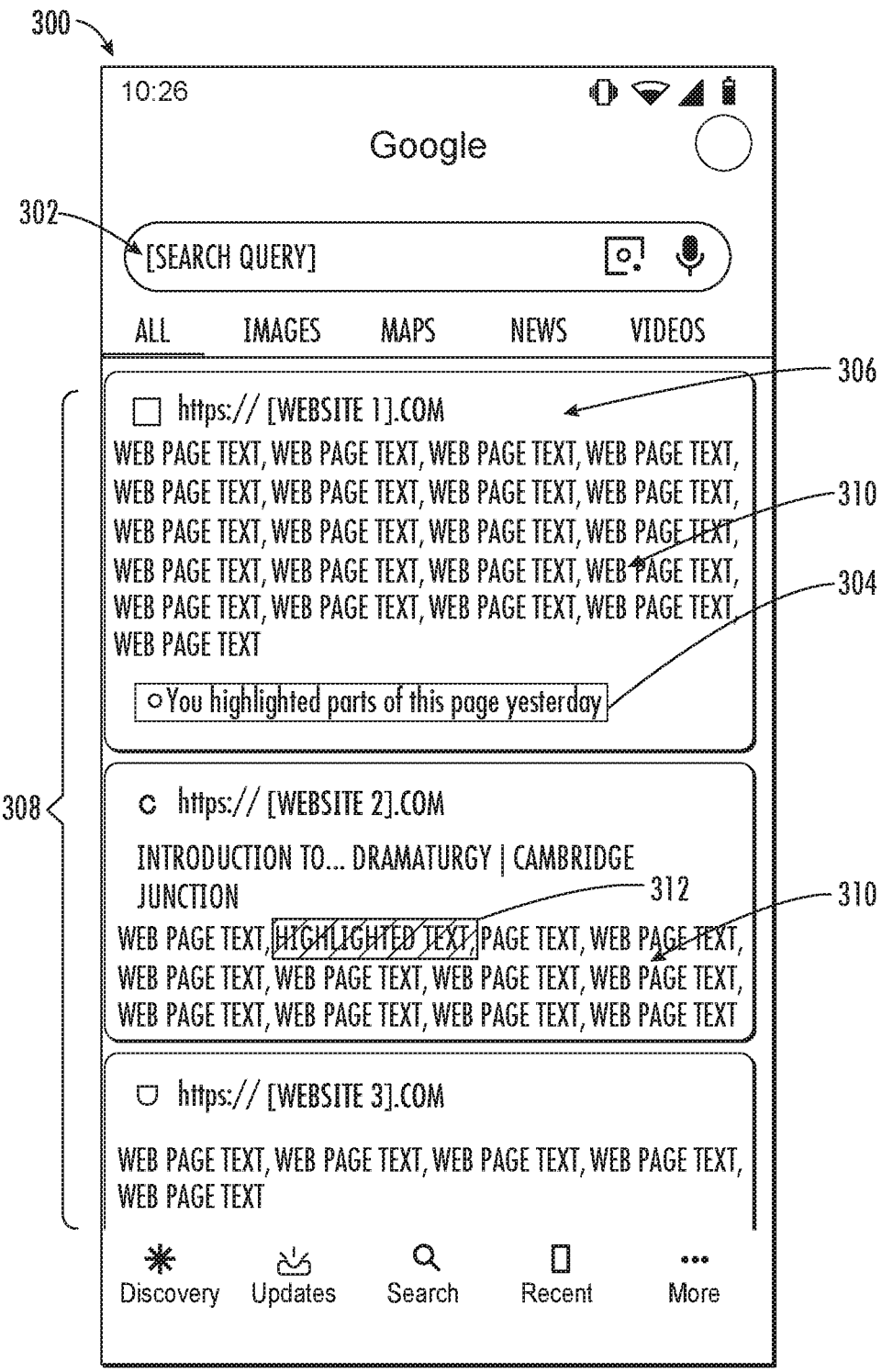
FIG. 3A depicts a user interface displaying a list of items in response to a search query and displaying, in the list of items, data describing a previously highlighted portion of a web page.

FIG. 3A depicts another user interface 300 in which the computing system has received, at a second time after the first time, a second user input describing a search query 302. The computing system can provide for display, data 304 describing the portion of the web page 306 in response to receiving the second user input. For example, the computing system can display search results that includes a list 308 of items including the web page 306 in response to receiving the second user input that describes the search query 302. The data 304 describing the portion of the web page 306 can be included in the list 308 of items. The data 304 can include text indicating that the user has previously highlighted something from the web page. In this example, the text states, "You highlighted parts of this page yesterday." As another example, the computing system can display, "You highlighted content on this web page three days ago." As a further example, the computing system can display, "You highlighted [reproduced highlighted text] on this web page two weeks ago." Thus, the computing system can provide data that describes the first user input and/or context data associated with receiving the first user input.

As another example, excerpts 310 can be provided from one or more of the items in the list 308 of search results. The computing system can display data describing the portion 312 of the web page by including the portion 312 in the respective excerpt 310 for the web page.

Figure 3B:
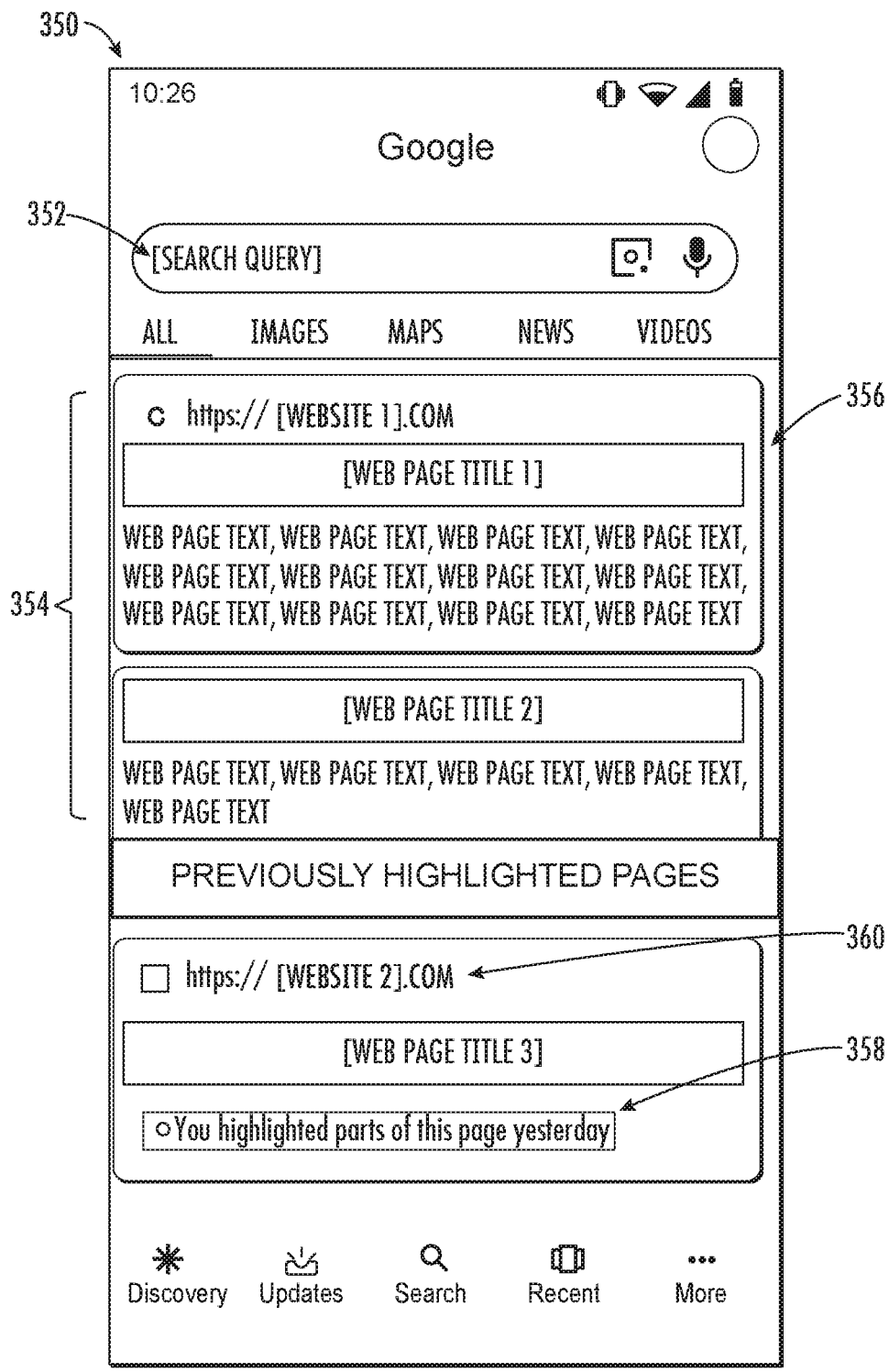
FIG. 3B depicts a user interface displaying, in a first region of the user interface, a list of web pages in response to a search query and displaying, in a second region of the user interface, data describing

FIG. 3B depicts a user interface 350 in which the computing system has received, at a second time after the first time, a second user input describing a search query 352. The computing system can provide search results including a list 354 of items for display in a first region 356 and/or panel of the user interface 350 in response to receiving the second user input describing the search query 352. Data 358 describing the portion of the web page (e.g., the previously highlighted portion) can be displayed in a second region 358 and/or panel of the user interface 350 that is outside of the list 354 of items of the search results. For instance, data describing one or more previously highlighted web pages 360 and/or content from the previously highlighted web pages can be displayed concurrently with the search results (e.g., list 354) in the user interface 350. The previously highlighted web pages can be selected based on being associated with and/or relevant to the search query 352 and/or list 354 of search results.

Figure 4A:
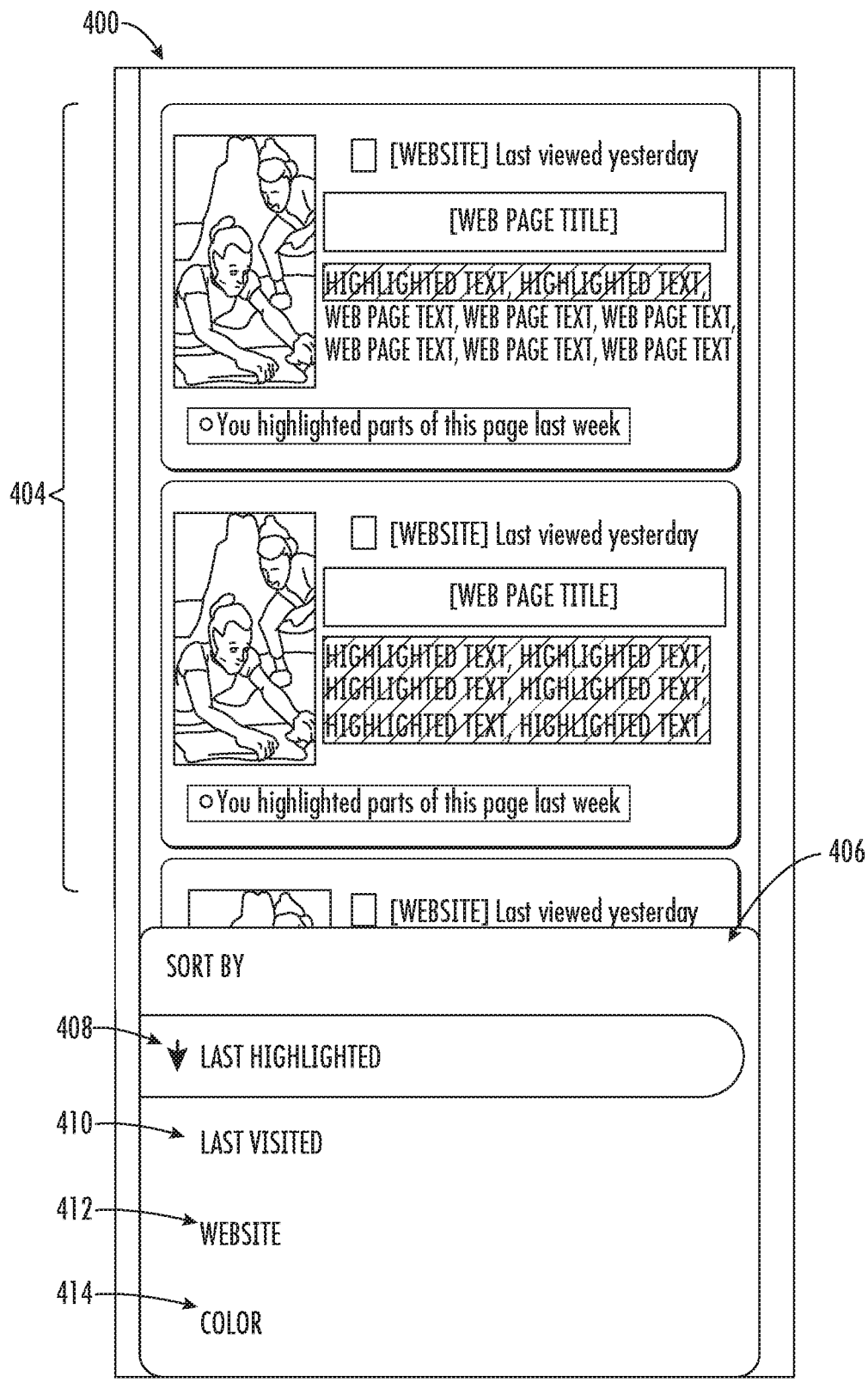
FIG. 4A depicts a user interface displaying a list of web pages that the user has previously highlighted and data describing previously highlighted portions of the web pages.
Figure 4B:
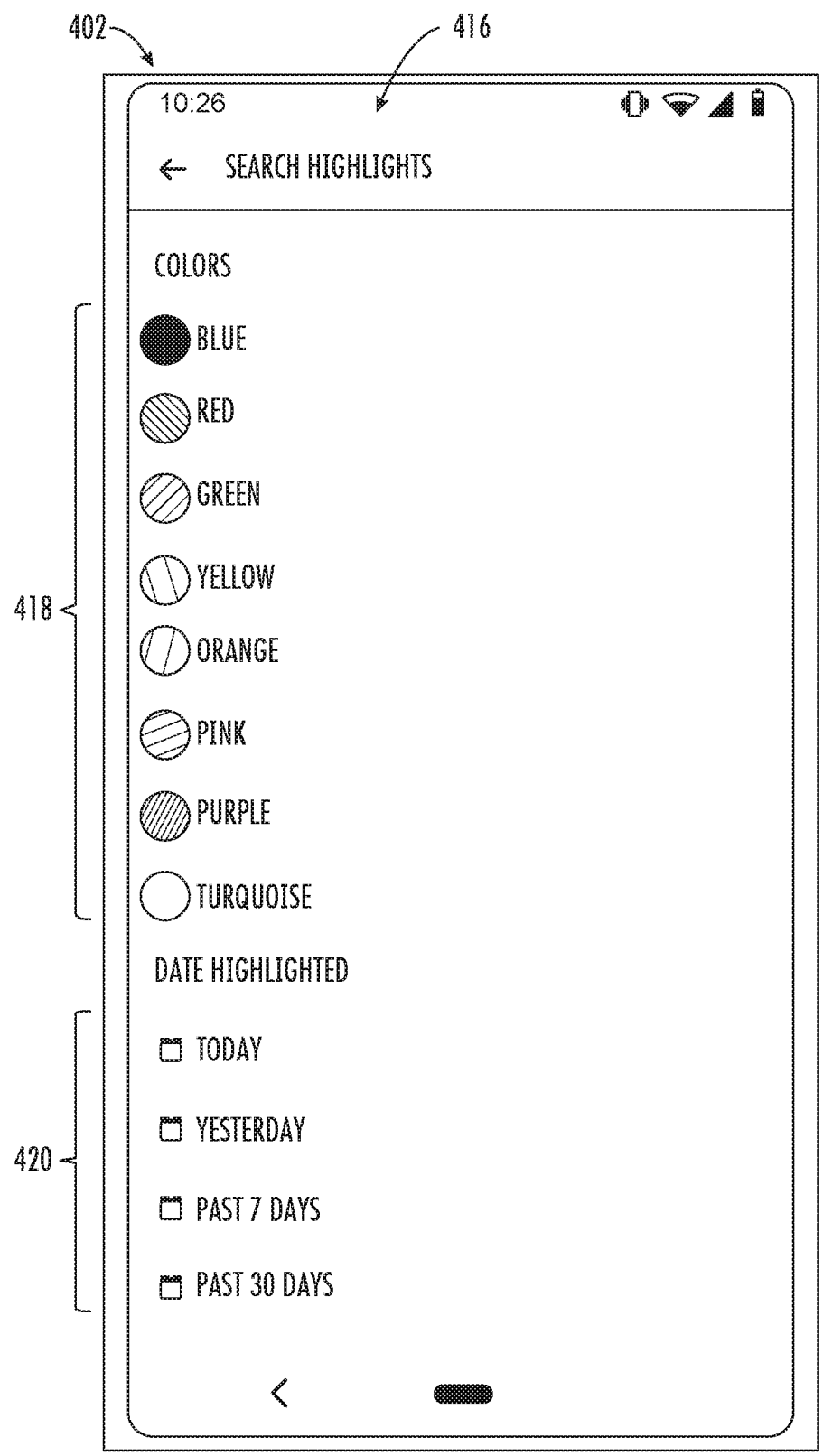
FIG. 4B depicts a user interface that can facilitate sorting and/or filtering of search results and/or filtering a body of material that the computing system can be configured to search in response to receiving a search query according to aspects of the present disclosure.

FIG. 4A depicts a first user interface 400, and FIG. 4B depicts a second user interface 402 according to aspects of the present disclosure. The first user interface 400 can display a list 404 of web pages that the user has previously highlighted. The first user interface 400 can include a panel 406 providing various options. The panel 406 can allow the user to filter and/or sort the list 404 of web pages that the user has previously highlighted. For example, the panel 406 can include buttons for sorting and/or filtering by "Last highlighted" 408, "Last visited" 410, "Website" 412 and/or "Color" 414. In response to selection of "Last highlighted" 408, the computing system can sort the list 404 of web pages according to when the user last visited the respective web pages. In response to selection of "Last visited" 410, the computing system can sort the list 404 of web pages according to when the user last visited the web pages. In response to selection of "Website" 412, the computing system can sort and/or filter the list 404 of web pages according to respective websites in which the web pages are included. For example, the user can view all web pages that the user has highlighted for a particular website. In response to selection of "Color" 414, the computing system can sort and/or filter the list 404 of web pages according to the color and/or style that the user selected for highlighting.

The second user interface 402 can be configured to allow the user to search through portions of text that the user previously highlighted, for example, using a search bar 416. For instance, in response to receiving a search query in the search bar 416, the computing system can search each portion of text that the user has previously highlighted. As another example, in response to receiving a search query in the search bar 416, the computing system can search each web page that the portion of text that the user has previously highlighted.

Referring to FIG. 4B, the second user interface 402 can allow the user to sort and/or filter the search results from searching using the search bar 416 and/or filter the body of material that the search bar 416 can be used to search. For example, the user can input a search query in the search bar 416 and the user interface 402 can return a list of search results. The user can subsequently filter the search results by color/style 418 and/or by date highlighted 420. Additionally and/or alternatively, the user can apply one or more filters by color/style 418 and/or by date highlighted 429 to the body of material to which the search will be applied. For instance, the user can apply a filter of (1) highlighted 420 in the past 7 days, and (2) color 418 being pink and/or purple. The user can then enter a search query in the search bar 416 and search only through highlights assigned pink or purple for the color and that were highlighted in the past 7 days.

According to aspects of the present disclosure, the computing system can be configured to allow the user to switch between the highlighted (e.g., outdated) version and the updated (e.g., newer) version of the web page. The computing system can be configured to receive, from a user at a first time, a first user input directed to a portion of a first version of a web page, for example as described above with reference to FIG. 2. For example, a user can highlight text on the web page at the first time. At a later time, the user can revisit the highlighted web page. The computing system can receive, at a second time after the first time, a second user input requesting display of the web page. For example, the user can navigate to the web page in a list of search results and/or through a list of previous highlights and/or highlighted web pages, for example as described above with reference to FIGS. 4A and 4B. The user can return to the web page that the user previously highlighted.

Figure 5A:
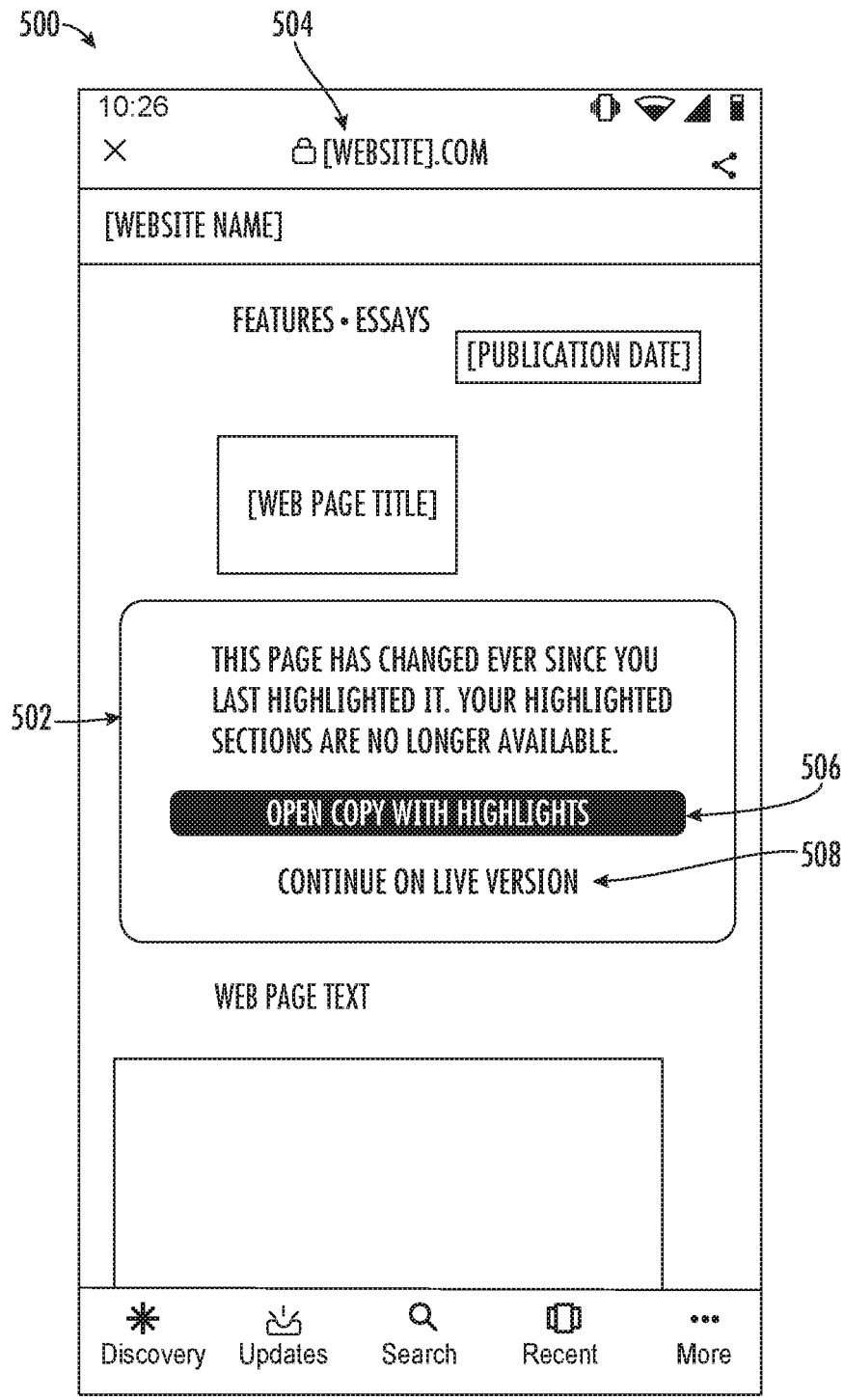
FIG. 5A illustrates a user interface displaying a notification that a requested web page has been updated since the user has highlighted the web page, according to aspects of the present disclosure.
Figure 5B:
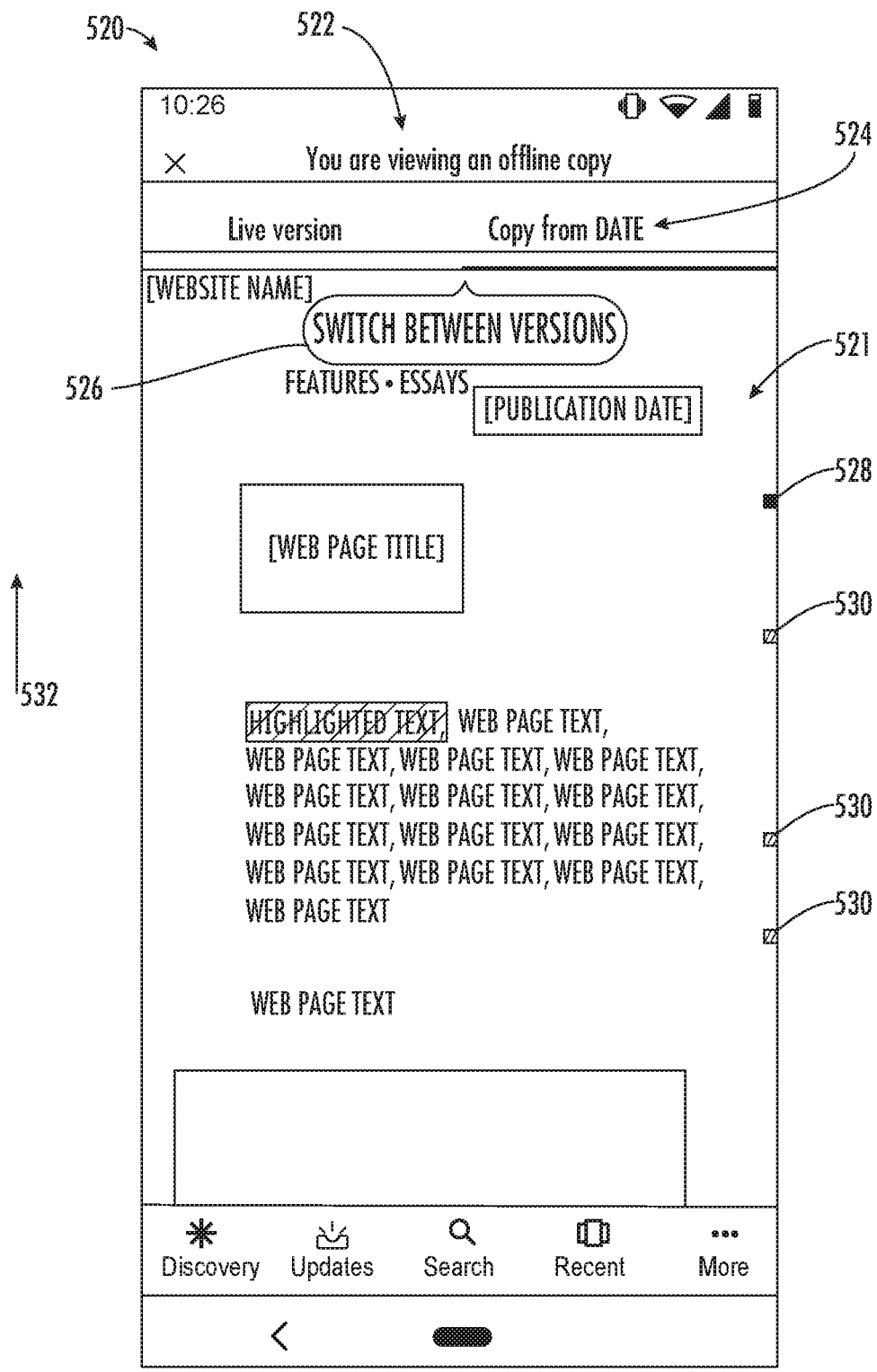
FIG. 5B illustrates a user interface configured to allow the user to switch between multiple versions of a web page according to aspects of the present disclosure.

FIG. 5A illustrates a user interface 500 displaying a notification 502 that a requested web page 504 has been updated since the user has highlighted the web page 504. The computing system can be configured to identify when a previously highlighted webpage 504 has been updated and provided display the notification 502 in response to a user input requesting display of the web page 504. FIG. 5B illustrates a user interface 520 configured to allow the user to switch between multiple versions of a web page. Referring to FIG. 5A, the notification 502 can include a first button 506 configured to open a copy or version of the web page 504 that includes the user's highlights. The notification 502 can include a second button 508 configured to open an updated or "live" version of the web page 504. In response to selection of one of the buttons 506, 508, the computing system can display the requested version of the web page 504. For example, in response to receiving a user input directed to the button 506 that is configured to open the version of the web page 504 including the user's highlights, the computing system can display the user interface 520 of FIG. 5B.

Referring to FIG. 5B, the computing system can display the user interface 500 including at least one of the first version of the web page and the second version of the web page. In this example, the user interface 520 includes a highlighted version 521 of the web page. The user interface 520 can display one or more text strings 522, 524 indicating that the displayed web page is not current. One example text string 522 can include "You are viewing an offline copy," or the like. Another example text string 524 can include a date that the web page was archived and/or highlighted, such as "Copy from Dec. 9, 2019."

The user interface 520 can include an interactive object 526, such as button, slider, or the like for switching between the highlighted version 521 of the web page and the updated, "live version" of the web page. The highlighted version 521 of the web page can include one or more highlighted portions 523. The computing system can facilitate switching between the first version and the second version of the web page. The computing system can receive a third user input requesting display of the other of the first version of the web page and the second version of the web page. For example, the user can provide the third user input directed to the interactive object 526 to request display of the other version of the web page. The computing system can update the user interface to display the other of the first version of the web page or the second. In this example, the computing system can switch between displaying the currently displayed highlighted version 521 with a live version of the web page.

In some embodiments the computing system can display one or more indicators 528, 530. For example, an on-screen indicator 528 can indicate that a highlighted portion 523 is currently displayed in the user interface 520. One or more off-screen indicators 530 can be displayed to indicate relative positions of off-screen highlighted portions of the web page with respect to the currently displayed portion of the web page 21. The off-screen indicators 530 can be spaced in a vertical direction 532 in proportion to respective vertical positioning of off-screen highlighted portions of the web page 521. In this example, the indicators 528, 530 can be positioned along an edge of the user interface 520. However, the indicators 528, 530 can be located at any suitable location within the user interface 520. Additionally, in some embodiments, the indicators 528, 530 can convey color, category, and/or style information with respect to the respective highlighted portions of the web page 521. For instance, the indicators 528, 530 can include respective colors corresponding with the respective colors of the highlighted portions to which the indicators 528, 530 correspond. Thus, the computing system can display one or more indicators 528, 530 to convey to the user one or more of a number, a relative location, and/or a color/style of highlighted sections within the currently displayed web page 521.

In some embodiments, in response to detecting a user input directed to an off-screen indicator 530, the computing system can navigate to a previously highlighted portion of the web page 521 that corresponds with the indicator 530 to which the user input is directed. Thus, the indicators 528, 530 can facilitate navigation within the web page 521 between previously highlighted portions of the web page 521. Indicators 528, 530 are also illustrated in FIG. 2.

Figure 5C:
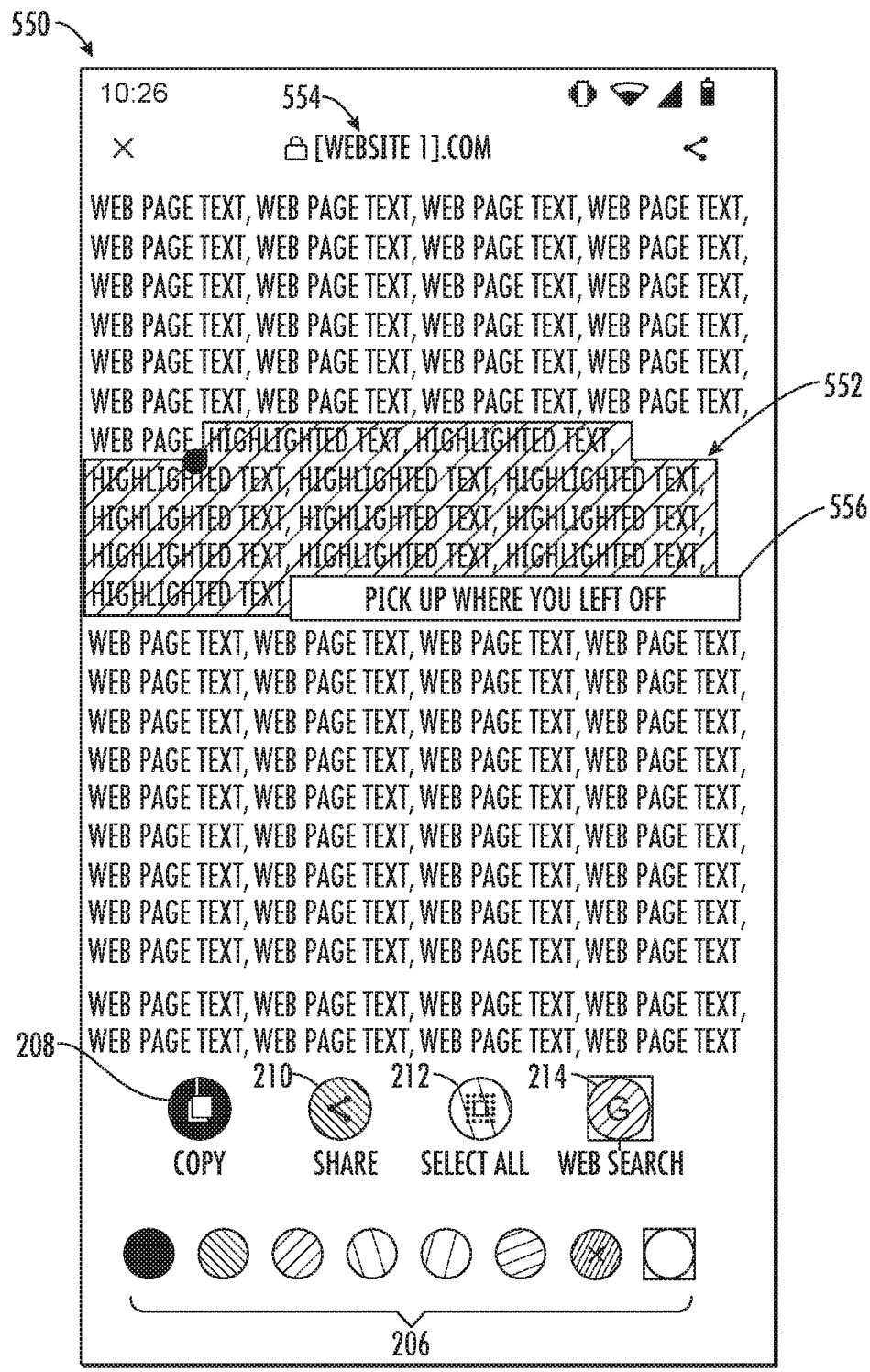
FIG. 5C depicts a user interface of a user computing device, in which, in response to receiving a user input that requests display of a web page that the user has previously visited and/or highlighted according to aspects of the present disclosure.

FIG. 5C depicts a user interface 550 of a user computing device. In some embodiments, in response to receiving a user input that requests display of a web page 554 that the user has previously visited and/or highlighted, the computing system can automatically display a last viewed portion of the web page or the portion 552 of the web page 554 to which the first user input was directed (e.g., a previously highlighted portion of the web page). For example, when the user revisits a web page 554 that the user has previously highlighted, the computing system can display the web page 554 and automatically navigate to the portion 552 of the web page 554 that was previously highlighted.

As another example, when the user revisits a web page 554 that the user has previously visited, the computing system can automatically navigate to the last viewed portion of the web page 554. The computing system can automatically display an indicator 556, such as "Pick Up Where You Left Off," or the like to provide information to the user explaining or describing the automatic navigation within the web page 554. However, it should be understood that returning to the last viewed portion of the web page 554 can include returning to a web page that the user has not previously highlighted.

In some embodiments, the computing system can establish one or more automatic bookmarks based on how the user has navigated the web page 554. For example, if the user has lingered on a particular portion of the web page 554, the computing system can save an automatic bookmark describing the particular portion of the web page. For example, the computing system can automatically save a bookmark in response to the user scrolling slower than threshold scrolling speed and/or statically viewing a particular portion of the web page 554 for longer than a threshold period of time.

Furthermore, in some embodiments, eye-tracking technology can be employed, for example, to more accurately automatically bookmark the web page 554. Movements, gaze locations, gaze durations, and the like of one or more of the user's eyes can be detected. For example, the computing system can include a forward-facing camera that can detect one or more images of the user's eyes. The computing system can determine a focal point of the user's eyes with respect to the web page 554. The focal point can be detected or tracked over a time period during which the user is viewing the web page 554. In response to the focal point (e.g., eye movement(s), gaze location(s), and/or gaze duration(s)) satisfying one or more threshold criteria, a portion of the web page 554 corresponding with the gaze location(s) and can be automatically bookmarked for display when the user returns to the web page 554.

When the user returns to the web page at a later time, the computing system can automatically navigate to one or more of the automatic bookmarks. Further, in some embodiments, when the user returns to the web page, the computing system can display the more indicators 528, 530 visually describing relative locations of one or more of the automatic bookmarks. Indicators corresponding with automatic bookmarks can be displayed differently than indicators corresponding with previously highlighted portions. For example, indicators corresponding with automatic bookmarks (e.g., indicators 530) can differ in brightness/darkness, color, size, and the like with respect to indicators corresponding with previously highlighted portions of the web page 554 (e.g., indicators 530).

Example Methods

Figure 6:
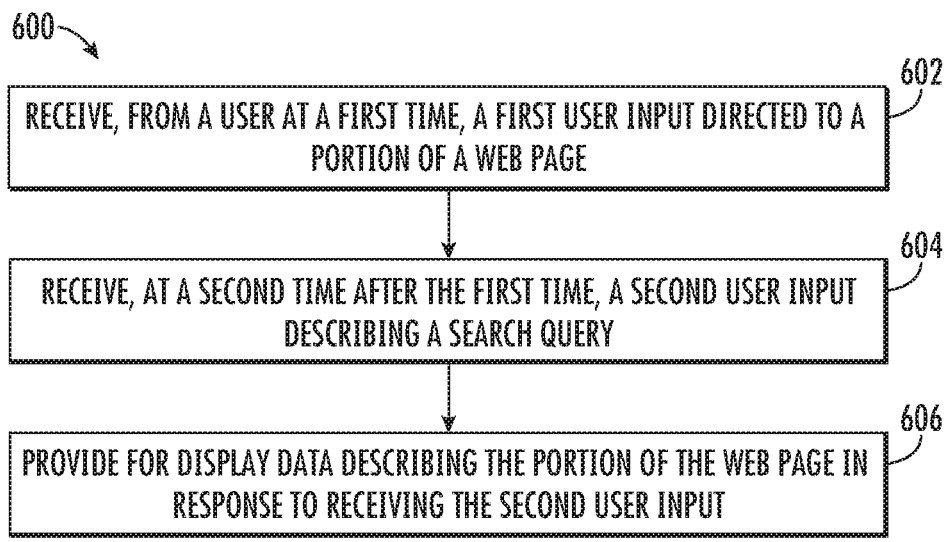
FIG. 6 depicts a flow chart diagram of an example method for saving and surfacing content based on the saved content according to aspects of the present disclosure.

FIG. 6 depicts a flow chart diagram of an example method for saving and surfacing content based on the saved content. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, the method 600 can include receiving, from a user at a first time, a first user input directed to a portion of a web page. For example, the user can provide an input that requests highlighting the portion of the web page as described above with reference to FIG. 2.

At 604, the method 600 can include receiving, at a second time after the first time, a second user input describing a search query, for example as described above with reference to FIGS. 3A and 3B. For example, the user can input a text string or an image as a search query.

At 606, the method 600 can include providing for display data describing the portion of the web page in response to receiving the second user input, for example as described above with reference to FIGS. 3A and 3B.

In some embodiments, search results that includes a list of items including the web page can be displayed in response to receiving the second user input that describes the search query. As one example, the list of items can include text indicating that the user has previously highlighted something from the web page. As a further example, the list of items can include some or all of the portion of the web page to which the first user input was directed (e.g., the content previously highlighted from the web page).

However, in other embodiments, search results can be provided for display in a first region of a user interface in response to receiving the second user input describing the search query. The search results can include a list of items. The data describing the portion of the web page (e.g., the previously highlighted portion) can be displayed in a second region of the user interface that is outside of the list of items of the search results. The search results can be displayed in a first panel. The data describing the portion of the web page can be displayed in a second panel. For instance, a list of previously highlighted web pages and/or content from the previously highlighted web pages can be displayed concurrently with the search results. The previously highlighted web pages can be selected based on being associated with and/or relevant to the search query and/or search results.

In some embodiments, providing for display the data describing the portion of the web page can include providing data describing the first time at which the first user input was received. For example, text describing a day and/or time that the previous highlighting occurred (e.g., the first time) can be displayed. As another example, a relative time interval can be displayed describing how long ago the first user input was received (e.g., when the previous highlighting occurred). For instance, the method can include displaying, "You highlighted content on this web page three days ago." As a further example, the method can include displaying, "You highlighted [some or all of the highlighted text] on this web page two weeks ago." Thus, the method can include providing data that describes the first user input and/or information associated with receiving the first user input.

In some embodiments, the computing system can display some or all of the previously highlighted content in a separate region or panel that is adjacent the search results, for example, based on the highlighted content being similar to the search results and/or relevant to the search query. As a further example, the computing system can select one or more web pages or other documents as relevant to the search query based on the previously highlighted content.

In some embodiments, the method can include selecting, based on the portion of the web page to which the first user input was directed, an additional web page that is distinct from the web page to which the first user input was directed. The method can include providing for display data that describes the additional web page in response to receiving the second user input describing the search query. As one example, the method can include displaying "These web pages may be interesting to you based on your highlight of [reproduced highlighted content] on [web page to which the first user input was directed]."

Figure 7:
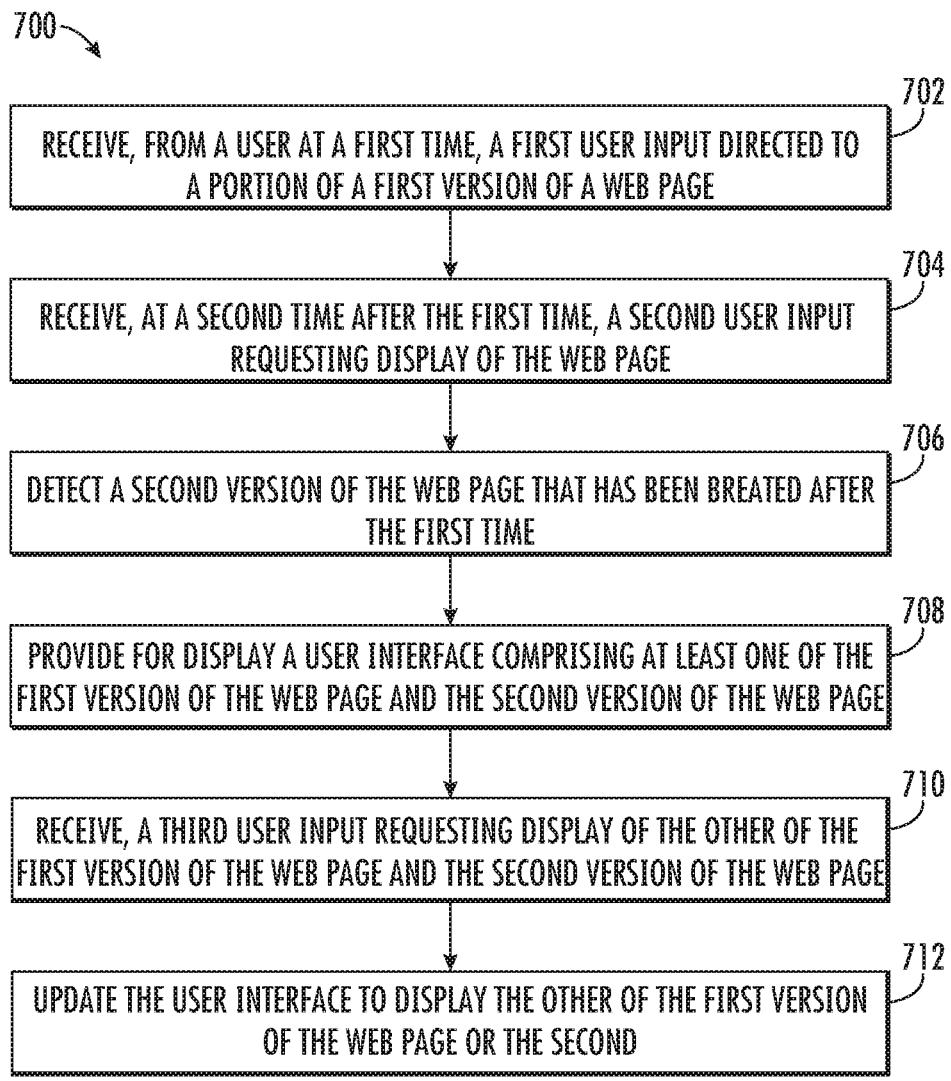
FIG. 7 depicts a flow chart diagram of an example method for saving and surfacing content based on the saved content according to aspects of the present disclosure.

FIG. 7 depicts a flow chart diagram of an example method for saving and surfacing content based on the saved content. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

The method 700 can include, at 702, receiving, from a user at a first time, a first user input directed to a portion of a first version of a web page. For example, the user can provide an input that requests highlighting the portion of the web page as described above with reference to FIG. 2.

The method 700 can include, at 704, receiving, at a second time after the first time, a second user input requesting display of the web page. For example, the user can provide an input requesting to view the web page again. The user can select the web page in a list of search results, enter the web page's address, or otherwise provide an input that request display of the web page.

The method 700 can include, at 706, detecting, a second version of the web page that has been created after the first time. For example, the computing system can retrieve a current version of the web page and compare the current version of the web page (or metadata thereof) with an archived version of the web page (or metadata thereof).

The method 700 can include, at 708, providing for display, a user interface including at least one of the first version of the web page and the second version of the web page, for example as described above with reference to FIG. 5.

The method 700 can include, at 710, receiving, a third user input requesting display of the other of the first version of the web page and the second version of the web page. For example, in response to detecting a user input that requests that the other web page be displayed, the computing system can display the other of the first version of the web page and the second version of the web page. For instance, the user interface can display an interactive object (e.g., button, slider, etc.) and can detect a user input directed to the interactive object that requests switching between the currently displayed version of the web page and the other version of the web page, for example as described above with reference to FIG. 5.

The method 700 can include, at 712, updating the user interface to display the other of the first version of the web page or the second version of the web page. The user interface can be updated to switch between the versions of the web page.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for saving content, the method comprising:
   receiving, by one or more computing devices from a user at a first time, a first user input directed to a portion of a web page, wherein the first user input comprises a selection of a text segment of the portion of the web page;
   storing, by the one or more computing devices, user data descriptive of the first user input and a last viewed portion of the web page;
   receiving, by the one or more computing devices at a second time after the first time, a second user input describing a search query;
   providing for display, by the one or more computing devices, a plurality of search results, wherein a particular search result is associated with the web page, wherein the particular search result comprises data describing the portion of the web page in response to receiving the second user input, and wherein one or more other search results of the plurality of search results are determined based on the portion of the web page selected with the first user input;
   receiving, by the one or more computing devices, a third user input requesting display of the web page; and
   providing, by the one or more computing devices, the last viewed portion of the web page and one or more indicators for display based on the user data, wherein the one or more indicators are descriptive of a relative position of one or more selected portions of the web page selected by one or more user inputs, wherein the one or more user inputs comprise the first user input, and wherein the one or more indicators are descriptive of whether a respective selected portion is currently displayed.

2. The computer-implemented method of claim 1, wherein providing for display the data describing the portion of the web page comprises providing for display at least a portion of the text segment of the web page.

3. The computer-implemented method of claim 1, wherein providing for display the data describing the portion of the web page comprises providing data describing the first time at which the first user input was received.

4. The computer-implemented method of claim 1, wherein providing for display the data describing the portion of the web page comprises providing the data describing the portion of the web page in a list of items.

5. The computer-implemented method of claim 1, further comprising providing for display in a first region of a user interface, search results in response to receiving the second user input describing the search query, the search results comprising a list of items, and wherein providing for display the data describing the portion of the web page comprises providing the data describing the portion of the web page in a second region of the user interface that is outside of the list of items of the search results.

6. The computer-implemented method of claim 1, further comprising associating, by the one or more computing devices, data describing at least one of the web page or the portion of the web page with a user profile associated with the user.

7. The computer-implemented method of claim 1, further comprising:
   selecting, based on the portion of the web page to which the first user input is directed, an additional web page that is distinct from the web page; and
   providing for display data that describes the additional web page in response to receiving the second user input describing the search query.

8. The computer-implemented method of claim 1, further comprising:
   providing, by the one or more computing devices, an automatic navigation indicator describing the automatic navigation within the web page.

9. The computer-implemented method of claim 1, further comprising:
   receiving, by the one or more computing devices, a fourth user input selecting an indicator, wherein the indicator indicates a relative position of the portion of the web page associated with the first user input; and
   providing, by the one or more computing devices, the portion of the web page for display.

10. The computer-implemented method of claim 1, further comprising:
    generating, by the one or more computing devices, an automatic bookmark associated with a particular portion of the web page based on at least one of the user scrolling speed being lower than a threshold scrolling speed associated with the particular portion of the web page or a static viewing of the particular portion of the web page; and
    storing, by the one or more computing devices, the automatic bookmark;
    wherein a bookmark indicator is displayed with the last viewed portion of the web page, wherein the bookmark indicator visually describes a relative location of the automatic bookmark.

11. The computer-implemented method of claim 1, further comprising:
    obtaining, by the one or more computing devices, one or more images of an eye of the user from a camera;
    determining, by the one or more computing devices, a focal point based on the one or more images;
    generating, by the one or more computing devices, an automatic bookmark associated with a particular portion of the web page based on the focal point, wherein the focal point is associated with the particular portion of the web page; and
    storing, by the one or more computing devices, the automatic bookmark;
    wherein a bookmark indicator is displayed with the last viewed portion of the web page, wherein the bookmark indicator visually describes a relative location of the automatic bookmark.

12. The computer-implemented method of claim 1, wherein the one or more other search results of the plurality of search results determined based on the portion of the web page selected with the first user input are displayed in a separate panel from the particular search result that comprises data describing the portion of the web page.

13. A system for saving content, the system comprising:
    at least one processor;
    at least one tangible, non-transitory computer-readable medium that stores instructions that, when executed by the at least one processor, cause the at least one processor to perform operations, the operations comprising:
    receiving, by one or more computing devices from a user at a first time, a first user input directed to a portion of a web page, wherein the first user input comprises a selection of a text segment of the portion of the web page;

storing user data descriptive of the first user input and a last viewed portion of the web page;

receiving, by the one or more computing devices at a second time after the first time, a second user input describing a search query;

providing for display, by the one or more computing devices, a plurality of search results, wherein a particular search result is associated with the web page, wherein the particular search result comprises data describing the portion of the web page in response to receiving the second user input, and wherein one or more other search results of the plurality of search results are determined based on the portion of the web page selected with the first user input;

receiving a third user input requesting display of the web page;

providing the last viewed portion of the web page and one or more indicators for display based on the user data, wherein the one or more indicators are descriptive of a relative position of one or more selected portions of the web page selected by one or more user inputs, wherein the one or more user inputs comprise the first user input, and wherein the one or more indicators are descriptive of whether a respective selected portion is currently displayed.

14. The system of claim 13, wherein the operations further comprise providing for display the plurality of search results in response to receiving the second user input describing the search query, wherein the one or more other search results comprise a list of items including the web page.

15. The system of claim 14, wherein providing for display the data describing the portion of the web page comprises providing the data describing the portion of the web page adjacent to the list of items.

16. The system of claim 13, wherein the operations further comprise providing for display in a first region of a user interface, search results in response to receiving the second user input describing the search query, the search results comprising a list of items, and wherein providing for display the data describing the portion of the web page comprises providing the data display describing the portion of the web page for display in a second region of the user interface that is outside of the list of items of the search results.

17. The system of claim 13, wherein the operations further comprise associating, by the one or more computing devices, data describing at least one of the web page or the portion of the web page with a user profile associated with the user.

18. The system of claim 13, wherein the operations further comprise:

selecting, based on the portion of the web page to which the first user input is directed, an additional web page that is distinct from the web page; and providing for display data that describes the additional web page in response to receiving the second user input describing the search query.

19. A computer-implemented method for saving content, the method comprising:

receiving, by one or more computing devices from a user at a first time, a first user input directed to a portion of a first version of a web page, wherein the first user input comprises a selection of a text segment of the portion of the web page;

receiving, by the one or more computing devices at a second time after the first time, a second user input describing a search query;

providing for display, by the one or more computing devices, a plurality of search results, wherein a particular search result is associated with the web page, wherein the particular search result comprises data describing the portion of the web page in response to receiving the second user input, and wherein one or more other search results of the plurality of search results are determined based on the portion of the web page selected with the first user input;

receiving, by the one or more computing devices, a third user input requesting display of the web page;

detecting, by the one or more computing devices, a second version of the web page that has been created after the first time;

providing for display, by the one or more computing devices, a user interface comprising at least one of the first version of the web page and the second version of the web page;

receiving, by the one or more computing devices, a fourth user input requesting display of the other of the first version of the web page and the second version of the web page; and updating, by the one or more computing devices, the user interface to display the other of the first version of the web page or the second;

wherein at least one of the first version of the web page and the second version of the web page are displayed with one or more indicators, wherein the one or more indicators indicate a relative position of one or more selected portions of the first version of the web page selected by one or more user inputs with respect to a currently displayed portion of at least one of the first version of the web page or the second version of the web page, wherein the one or more user inputs comprise the first user input, and wherein the one or more indicators are descriptive of whether a respective selected portion is currently displayed, wherein the one or more indicators are positioned along an edge of the user interface, and wherein the one or more indicators are displayed adjacent to text of the web page.

20. The system of claim 13, wherein the one or more indicators comprise an indicator descriptive of an off-screen portion of the web page, wherein the indicator indicates a relative position of the portion of the web page associated with the first user input with respect to a currently displayed portion of the web page.

* * * * *